US012723178B2

(12) United States Patent
Kaji et al.

(10) Patent No.: US 12,723,178 B2
(45) Date of Patent: Sep. 1, 2026

(54) PRESSURE-SENSITIVE ADHESIVE TAPE

(71) Applicant: SEKISUI CHEMICAL CO., LTD., Osaka (JP)

(72) Inventors: Shouji Kaji, Shiraoka (JP); Takaaki Sakon, Minamisaitama-gun (JP); Taku Sasaki, San Jose, CA (US)

(73) Assignee: SEKISUI CHEMICAL CO., LTD., Osaka (JP)

( * ) Notice: Subject to any disclaimer, the term of this patent is extended or adjusted under 35 U.S.C. 154(b) by 715 days.

(21) Appl. No.: 17/795,328

(22) PCT Filed: Jan. 27, 2021

(86) PCT No.: PCT/JP2021/002853
§ 371 (c)(1),
(2) Date: Jul. 26, 2022

(87) PCT Pub. No.: WO2021/153619
PCT Pub. Date: Aug. 5, 2021

(65) Prior Publication Data

US 2023/0145319 A1 May 11, 2023

(30) Foreign Application Priority Data

Jan. 28, 2020 (JP) ................................ 2020-011798
Jan. 28, 2020 (JP) ................................ 2020-011810

(51) Int. Cl.

| | |
|---|---|
| ***C09J 7/38*** | (2018.01) |
| ***C08K 3/04*** | (2006.01) |
| ***C08K 3/08*** | (2006.01) |
| ***C09J 9/02*** | (2006.01) |
| ***C09J 11/04*** | (2006.01) |
| ***C09J 133/08*** | (2006.01) |

(52) U.S. Cl.
CPC ............... *C09J 7/385* (2018.01); *C08K 3/041* (2017.05); *C08K 3/08* (2013.01); *C09J 7/38* (2018.01); *C09J 9/02* (2013.01); *C09J 11/04* (2013.01); *C09J 133/08* (2013.01); *C08K 2003/0893* (2013.01); *C08K 2201/001* (2013.01); *C09J 2301/302* (2020.08); *C09J 2301/312* (2020.08); *C09J 2301/408* (2020.08); *C09J 2433/00* (2013.01)

(58) Field of Classification Search
None
See application file for complete search history.

(56) References Cited

U.S. PATENT DOCUMENTS 5,985,957 A 11/1999 Sakakibara et al.
2005/0062024 A1* 3/2005 Bessette .................... C09J 7/38 252/500

FOREIGN PATENT DOCUMENTS

| | | | |
|---|---|---|---|
| JP | 9-228079 | 9/1997 | |
| JP | 9-242982 | 9/1997 | |
| JP | 2012-21124 | 2/2012 | |
| JP | 2013049764 A * | 3/2013 | ........... C09J 7/0246 |
| JP | 2014-114377 | 6/2014 | |
| JP | 2019-127606 | 8/2019 | |

OTHER PUBLICATIONS

Machine translation of JP 2013049764 A (Year: 2013).*
International Search Report (ISR) issued Apr. 20, 2021 in International (PCT) Application No. PCT/JP2021/002853.
Ye Yangxiang et al., ed., "Practical Manual of Coating Technology", China Machinery Industry Press, Mar. 1998, first edition, Part 1 Coating Technology Materials—Coatings, pp. 88, (4) Pigments and fillers, with partial English translation.
Zhang Chunfu et al., ed., "Semiconductor Photovoltaic Cells", Xidian University Press, Apr. 2015, first edition, pp. 310, 9.2.4 Some new materials for replacing ITO, with partial English translation.
Han Yafang et al., ed., "Approaching Frontiers of New Materials 1", University of Science and Technology of China Press, Jun. 2019, first edition, pp. 71, with partial English translation.
Li Yinfeng et al., ed., "Research on the Preparation and Application of Carbon Nanomaterials", China Atomic Energy Press, Mar. 2019, first edition, pp. 127, 3. Organic contaminants, with partial English translation.

* cited by examiner

*Primary Examiner* — Frank D Ducheneaux
(74) *Attorney, Agent, or Firm* — Wenderoth, Lind & Ponack, L.L.P.

(57) ABSTRACT

The pressure-sensitive adhesive tape of the present invention is a pressure-sensitive adhesive tape comprising a pressure-sensitive adhesive layer comprising a photo-cured acrylic resin, a metal having a lower potential than that of iron, and an electroconductive material, wherein the pressure-sensitive adhesive layer has a total light transmittance X, per micrometer of the thickness, of 99.85% or less, and the pressure-sensitive adhesive layer has a total light transmittance Y of 6% or more. The present invention can provide a pressure-sensitive adhesive tape having a great adhesive force on both the front side and the back side and having good sacrificial corrosion resistance.

14 Claims, No Drawings

PRESSURE-SENSITIVE ADHESIVE TAPE

TECHNICAL FIELD

The present invention relates to a pressure-sensitive adhesive tape, and more specifically, relates to a pressure-sensitive adhesive tape suitably used for anticorrosion.

BACKGROUND ART

Anticorrosive coating materials containing a large amount of zinc are widely used in order to prevent corrosion of iron or an alloy including iron, such as steel. It is known that zinc is a metal having a lower potential than that of iron and that zinc thus exhibits the effect of sacrificial protection and has a high anticorrosive property. However, anticorrosion by a coating material needs a drying process after application, for example, and thus takes time for working, which decreases working efficiency when local repair is carried out in, for example, the use for civil engineering and construction, including bridges. In addition, unevenness in working is likely to occur in anticorrosion by a coating material.

Under the above-described circumstances, approaches for improving workability by imparting sacrificial corrosion resistance to a pressure-sensitive adhesive tape or the like are conventionally carried out. For example, PTL1 discloses a method for prevent corrosion, the method including attaching a laminate composed of a zinc plate, a resin film, a stainless steel plate, and an electroconductive pressure-sensitive adhesive layer containing a zinc powder, to an outer periphery of metal piping. In this method for preventing corrosion, zinc powder included in the pressure-sensitive adhesive layer and the zinc plate serve as sacrificial anodes to prevent corrosion of the metal piping.

However, the pressure-sensitive adhesive layer in PTL1 contains 60 to 95 mass % of zinc powder to impart electrical conductivity, and thus has a smaller adhesive force.

In contrast, PRL 2 discloses incorporating an electroconductive material in addition to a metal having a lower potential than that of iron, such as zinc, into a pressure-sensitive adhesive layer in an anticorrosive member to thereby impart electrical conductivity to the pressure-sensitive adhesive layer, and thus providing an anticorrosive member and an anticorrosive tape that enable both of the good pressure-sensitive adhesive property and the good sacrificial corrosion resistance.

CITATION LIST

Patent Literature

PTL1: JP 119-242982 A
PTL2: JP 2019-127606 A

SUMMARY OF INVENTION

Technical Problem

Generally, the pressure-sensitive adhesive layer is thickened (for example, to 100 μm or more) in an attempt to improve the adhesive force. It is common that a pressure-sensitive adhesive layer having such a large thickness is formed by curing a pressure-sensitive adhesive composition including an acrylic monomer by irradiation with light such as ultraviolet rays. However, since certain amounts or more of a metal having a lower potential than that of iron and an electroconductive material are contained in the pressure-sensitive adhesive layer to impart the sacrificial corrosion resistance, it is difficult for the light such as ultraviolet rays to penetrate, and the adhesive force of the pressure-sensitive adhesive layer is remarkably lower on the other side of the side irradiated with light, which is problematic.

The present invention has been made under the above-described circumstances. The first object of the present invention is to provide a pressure-sensitive adhesive tape comprising a pressure-sensitive adhesive layer including a photo-cured acrylic resin, the pressure-sensitive adhesive tape having a great adhesive force on both the front side and the back side and having good sacrificial corrosion resistance.

It is known that a pressure-sensitive adhesive layer that contains an electroconductive material as in the anticorrosion tape of PTL2 described above has a small resistance value, whereby sacrificial corrosion resistance is improved. However, as the electroconductive material is contained, the adhesive force is decreased in turn. Although even the anticorrosion tape of PTL2 is relatively good in the adhesive force and the sacrificial corrosion resistance, there is still a need to achieve both the adhesive force and the sacrificial corrosion resistance at higher levels.

The second object of the present invention is to provide a pressure-sensitive adhesive tape having both the adhesive force and the sacrificial corrosion resistance at higher levels.

Solution to Problem

The present inventors have earnestly studied. As a result, they have found that the first object described above can be solved by a pressure-sensitive adhesive tape comprising a pressure-sensitive adhesive layer comprising a photo-cured acrylic resin, a metal having a lower potential than that of iron, and an electroconductive material, wherein the pressure-sensitive adhesive layer has a total light transmittance X and a total light transmittance Y within specific ranges (hereinafter, also referred to as the pressure-sensitive adhesive tape according to the first invention), and thus have completed the present invention.

Furthermore, the present inventors have found that the second object described above can be solved by a pressure-sensitive adhesive tape comprising a pressure-sensitive adhesive layer including a metal having a lower potential than that of iron and carbon nanotube (hereinafter, also referred to as the pressure-sensitive adhesive tape according to the second invention), and thus have completed the present invention.

The present invention provide [1] to [15] as follows.

[1] A pressure-sensitive adhesive tape comprising a pressure-sensitive adhesive layer comprising a photo-cured acrylic resin, a metal having a lower potential than that of iron, and an electroconductive material other than the metal, the pressure-sensitive adhesive layer having a total light transmittance X, per micrometer of a thickness thereof, of 99.85% or less, and the pressure-sensitive adhesive layer having a total light transmittance Y of 6% or more.

[2] The pressure-sensitive adhesive tape according to [1], wherein the metal having a lower potential than that of iron is zinc.

[3] The pressure-sensitive adhesive tape according to [1] or [2], wherein the electroconductive material is a needle-shaped carbon material.

[4] The pressure-sensitive adhesive tape according to [3], wherein the needle-shaped carbon material is carbon nanotube.

[5] The pressure-sensitive adhesive tape according to any one of [1] to [4], wherein the photo-cured acrylic resin is a polymerized product of a polymerizable monomer comprising an alkyl (meth)acrylate monomer (A).

[6] The pressure-sensitive adhesive tape according to [5], wherein the polymerizable monomer further comprises a polar group-containing vinyl monomer (B).

[7] A pressure-sensitive adhesive tape comprising a pressure-sensitive adhesive layer comprising a metal having a lower potential than that of iron, and carbon nanotube.

[8] The pressure-sensitive adhesive tape according to [7], wherein the pressure-sensitive adhesive layer has a total light transmittance X, per micrometer of a thickness thereof, of 99.85% or less.

[9] The pressure-sensitive adhesive tape according to [7] or [8], wherein the metal having a lower potential than that of iron is zinc.

[10] The pressure-sensitive adhesive tape according to [7] to [9], wherein the pressure-sensitive adhesive layer is made with an acrylic adhesive.

[11] The pressure-sensitive adhesive tape according to any one of [1] to [10], wherein the pressure-sensitive adhesive layer has a potential of −700 mV or less in a sacrificial protection test.

[12] The pressure-sensitive adhesive tape according to any one of [1] to [11], wherein the pressure-sensitive adhesive layer has a thickness of 100 to 3000 μm.

[13] The pressure-sensitive adhesive tape according to any one of [1] to [12], wherein the pressure-sensitive adhesive tape consists of the pressure-sensitive adhesive layer.

[14] The pressure-sensitive adhesive tape according to any one of [1] to [12], comprising a support, wherein the pressure-sensitive adhesive layer is provided on one side or each of both sides of the support.

[15] The pressure-sensitive adhesive tape according to any one of [1] to [14], wherein the pressure-sensitive adhesive tape is for use in anticorrosion.

Advantageous Effects of Invention

The present invention can provide a pressure-sensitive adhesive tape having a great adhesive force on both the front side and the back side and having good sacrificial corrosion resistance. The present invention can also provide a pressure-sensitive adhesive tape having both the adhesive force and the sacrificial corrosion resistance at higher levels

Description of Embodiments

The pressure-sensitive adhesive tape according to the first invention in the present invention is a pressure-sensitive adhesive tape comprising a pressure-sensitive adhesive layer comprising a photo-cured acrylic resin, a metal having a lower potential than that of iron, and an electroconductive material other than the metal, wherein the pressure-sensitive adhesive layer has a total light transmittance X, per micrometer of a thickness thereof, of 99.85% or less, and the pressure-sensitive adhesive layer has a total light transmittance Y of 6% or more.

[Pressure-Sensitive Adhesive Layer (Pressure-Sensitive Adhesive Layer of Pressure-Sensitive Adhesive Tape According to First Invention)]

The pressure-sensitive adhesive layer of the pressure-sensitive adhesive tape according to the first invention will be described below.

<Total Light Transmittance Y of Pressure-Sensitive Adhesive Layer>

The total light transmittance Y of the pressure-sensitive adhesive layer is 6% or more. If the total light transmittance Y of the pressure-sensitive adhesive layer is less than 6%, the pressure-sensitive adhesive layer has a less adhesive force. In more detail, the pressure-sensitive adhesive layer has a less adhesive force on the other side of the side irradiated with light. The reason for this is probably as follows: when the total light transmittance Y is small, it is difficult for light to reach the other side than the irradiated side, so that curing of the acrylic resin does not proceed sufficiently. The total light transmittance Y of the pressure-sensitive adhesive layer is the total light transmittance per the whole thickness of the pressure-sensitive adhesive layer.

The total light transmittance Y of the pressure-sensitive adhesive layer is preferably 7% or more, and more preferably 10% or more, in view of improving the adhesive force of the pressure-sensitive adhesive layer. For example, in a case where the pressure-sensitive adhesive layer has a thickness of 100 to 3000 μm, the total light transmittance Y is preferably 85% or less, and more preferably 80% or less, taking into account incorporating the metal having a lower potential than that of iron and the electroconductive material, which will be described later, into the pressure-sensitive adhesive layer to secure a certain sacrificial corrosion resistance. The total light transmittance Y can be adjusted by the kind and content of the electroconductive material, for example.

Herein the total light transmittance Y is a value measured in accordance with JIS K7361-1. The total light transmittance can be measured in an atmosphere at 23° C. and a humidity of 50% with a haze mater (e.g., Haze Meter NDH4000 manufactured by NIPPON DENSHOKU INDUSTRIES Co., Ltd.).

<Total Light Transmittance X of Pressure-Sensitive Adhesive Layer>

The pressure-sensitive adhesive layer has a total light transmittance X, per micrometer of a thickness thereof, of 99.85% or less. If the total light transmittance X is more than 99.85%, the pressure-sensitive adhesive layer has less sacrificial corrosion resistance, and corrosion of an adherend with the pressure-sensitive adhesive tape is likely to proceed.

The total light transmittance X is preferably 99.83% or less, more preferably 99.8% or less, and further preferably 99.7% or less, in view of improving the sacrificial corrosion resistance. The total light transmittance X is preferably 97% or more, and more preferably 98% or more, in view of easily adjusting the above-described total light transmittance Y within the desired range. The total light transmittance X can be adjusted by the kind and content of the electroconductive material, for example.

The total light transmittance X (%), per micrometer of the thickness, can be calculated using the following expression from the total light transmittance Y (%) and the thickness T (μm) of the pressure-sensitive adhesive layer.

[Expression 1]

$$\underset{(\%)}{\text{Total light transmittance } Y} = 100 \times \left(\frac{\text{Total light transmittance } X}{100}\right)^{T}$$

<Potential of Pressure-Sensitive Adhesive Layer>

The pressure-sensitive adhesive layer in the present invention preferably has a potential of −700 mV or less, more preferably −750 mV or less, and further preferably −800 mV or less, in a sacrificial protection test. A lower potential is more favorable in view of the sacrificial corrosion resistance; however, the potential is preferably −900 mV or more, taking into account the balance between the sacrificial corrosion resistance and the adhesive force. The potential of the pressure-sensitive adhesive layer in the sacrificial protection test can be adjusted by the kind and amount of the metal having a lower potential than that of iron and the electroconductive material, for example.

The sacrificial protection test is carried out by the following (1) and (2).

(1) A pressure-sensitive adhesive layer with a size of 150 mm×70 mm is attached to a steel plate SS400 (manufactured by TP Giken Corporation, 150 mm×70 mm) as an adherend.

(2) Thereafter, part (2 mm×2 mm) of the pressure-sensitive adhesive layer is cut out, and a NaCl aqueous solution having a concentration of 3 mass % is dropped thereon. A silver/silver chloride electrode is placed such that the tip of the electrode contacts with the NaCl aqueous solution, and the potential is measured using the electrode.

It is recommended that in the measurement of the potential, a digital multimeter "CDM-11D" (manufactured by CUSTOM corporation) is used as a tester, and that the negative electrode thereof is connected with an electrode "HS-205C" (manufactured DKK-TOA CORPORATION) via an electrode clip and used.

<Metal Having a Lower Potential Than That of Iron>

The pressure-sensitive adhesive layer in the present invention comprises a metal having a lower potential than that of iron. Since the metal having a lower potential than that of iron (hereinafter, also referred to as a "sacrificial protective metal") is contained, the pressure-sensitive adhesive layer has the sacrificial corrosion resistance, and increases the anticorrosive property of an adherend to which the pressure-sensitive adhesive tape of the present invention comprising the pressure-sensitive adhesive layer is attached. The sacrificial protective metal is dispersed in the photo-cured acrylic resin, which will be described later.

Examples of the sacrificial protective metal include cadmium, chrome, zinc, manganese, and aluminum. Among these, zinc and aluminum are preferable, and zinc is particularly preferable. When zinc is used, the sacrificial corrosion resistance is excellent.

The sacrificial protective metal, which is dispersed as a filler in the pressure-sensitive adhesive, may be in any form, such as a particulate form, a scale-like form, or a spindle-like form, and is preferably in a particulate form. The sacrificial protective metal in a particulate form is easily dispersed in the pressure-sensitive adhesive layer with almost no decrease in the pressure-sensitive adhesivity of the pressure-sensitive adhesive layer.

Herein, a particulate form means a form having a small ratio of the length in the major axial direction to the length in the minor axial direction (aspect ratio), and the aspect ratio is, for example, 3 or less, and is preferably 2 or less. The particulate form is not particularly limited and may be a spherical shape or irregular shape such as a powder. The above-described metal in a particulate form has a particle size of, for example, 1 to 500 μm and preferably, 1 to 200 μm. The particle size herein means an average particle size determined by the laser diffraction method.

The content of the sacrificial protective metal is preferably 5 to 30 parts by mass, and more preferably 10 to 25 parts by mass, per 100 parts by mass of the constituent unit derived from the alkyl (meth)acrylate monomer (A), which will be described later.

The constituent unit derived from the alkyl (meth)acrylate monomer (A) is the constituent unit of the photo-cured acrylic resin and is the major constituent unit.

The content of the sacrificial protective metal in the pressure-sensitive adhesive layer is preferably 3 to 25 mass %, and more preferably 7 to 20 mass %, based on the total mass of the pressure-sensitive adhesive layer.

<Electroconductive Material>

The pressure-sensitive adhesive layer in the present invention comprises an electroconductive material other than the above-described metal having a lower potential than that of iron. When the electroconductive material is contained, the electroconductivity is increased. This allows electrons to easily move to the adherend, whereby the anticorrosion performance is increased. Examples of the electroconductive material include one or two or more selected from a carbon material, a metal material, and a metal oxide material.

Examples of the carbon material include carbon black, graphite, graphene, carbon nanotube, carbon fiber, and acetylene black. Examples of the metal material include iron, and a metal having a higher potential than that of iron, such as gold, silver, copper, nickel, or an alloy including any of these. Examples of the metal oxide material include indium tin oxide (ITO), antimony trioxide (ATO), fluorine-doped tin oxide (FTO), and zinc oxide.

Of the electroconductive material described above, the carbon material is preferable, and among others, a needle-shaped carbon material is more preferable in view of easily adjusting the total light transmittance X and the total light transmittance Y within the desirable range described above. The needle-shaped carbon material may be a carbon material having an aspect ratio more than 3, and examples thereof include a carbon fiber and a carbon nanotube. Among these, the carbon nanotube is particularly preferable. The aspect ratio is a ratio of the length to the diameter.

The carbon nanotube is a material in a tube form that is made of carbon. The carbon nanotube is excellent in the electrical properties, and can be combined with a resin or the like to form, for example, a sheet having a high electroconductivity. The carbon nanotube is a substance having a structure in which a graphite sheet is cylindrically rolled up, the graphite sheet having a carbon atomic arrangement in the form of a reticulated pattern of hexagons. A mono-layered roll is called a single-wall carbon nanotube, and a multi-layered roll is called a multi-wall carbon nanotube.

In the present invention, the kind of the carbon nanotube is not particularly limited, and may be any of a single-wall carbon nanotube, a multi-wall carbon nanotube, and a mixture including them in an arbitral ratio. The carbon nanotube can be used that are produced by any of various methods including an arc discharge method, a laser evaporation method, and a chemical vapor deposition method (CVD method).

The average diameter of the carbon nanotube is preferably 1 to 100 nm, and more preferably 2 to 15 nm. The average length of the carbon nanotube is preferably 0.1 to 1000 μm, and more preferably 10 to 500 μm. The aspect ratio (average length/average diameter) of the carbon nanotube is preferably 10 to 100000, and more preferably 500 to 30000.

The diameter of the carbon nanotube means the outer diameter in a case of a single-wall carbon nanotube, and the outer diameter of the outermost tube in a case of a multi-wall carbon nanotube. The diameter and the length of the carbon nanotube may be measured in an image obtained by observation under a transmission electron microscope (TEM), for example, and the average diameter and the average length may be determined as an arithmetic average on arbitral fifty nanotubes.

The content of the electroconductive material in the pressure-sensitive adhesive layer is preferably 0.001 to 1 part by mass, more preferably 0.005 to 0.1 parts by mass, further preferably 0.008 to 0.065 parts by mass, and further preferably 0.01 to 0.025 parts by mass, per 100 parts by mass of the constituent unit derived from the alkyl (meth)acrylate monomer (A), which will be described later.

When the content of the electroconductive material is equal to or more than these lower limits, the total light transmittance X can be easily adjusted to fall within the desired range described above, and the sacrificial corrosion resistance can thus be easily increased. When the content of the electroconductive material is equal to or less than these upper limits, the total light transmittance Y can be easily adjusted to fall within the desired range described above, and the adhesive force can thus be easily increased.

The content of the electroconductive material in the pressure-sensitive adhesive layer is preferably 0.0005 to 0.7 mass %, more preferably 0.005 to 0.05 mass %, and further preferably 0.006 to 0.045 mass %, based on the total amount of the pressure-sensitive adhesive layer.

<Photo-Cured Acrylic Resin>

The pressure-sensitive adhesive layer in the present invention contains a photo-cured acrylic resin. The photo-cured acrylic resin means an acrylic resin that has been cured by irradiation with light such as ultraviolet rays.

The photo-cured acrylic resin is an acrylic resin obtained by polymerizing a polymerizable monomer including an alkyl(meth)acrylate monomer (A). The polymerization is carried out by irradiation with light such as ultraviolet rays.

(Alkyl(Meth)Acrylate Monomer (A))

The alkyl (meth)acrylate monomer (A) is an ester between (meth)acryl acid and an aliphatic alcohol, and is preferably an alkyl ester derived from an aliphatic alcohol having an alkyl group preferably having 2 to 14 carbon atoms, and more preferably 4 to 10 carbon atoms. When the amount of carbon atoms of the alkyl group is within this range, the pressure-sensitive adhesive layer can have a glass transition temperature (Tg) within an appropriate temperature range to secure a certain adhesive force.

Specific examples of the alkyl(meth)acrylate monomer (A) include ethyl(meth)acrylate, n-propyl(meth)acrylate, isopropyl(meth)acrylate, n-butyl(meth)acrylate, isobutyl (meth)acrylate, t-butyl(meth)acrylate, pentyl(meth)acrylate, hexyl(meth)acrylate, heptyl(meth)acrylate, 2-ethylhexyl (meth)acrylate, n-octyl(meth)acrylate, isooctyl(meth)acrylate, nonyl(meth)acrylate, decyl(meth)acrylate, undecyl (meth)acrylate, dodecyl(meth)acrylate, tridecyl(meth) acrylate, and tetradecyl(meth)acrylate.

Among these, n-butyl(meth)acrylate, hexyl(meth)acrylate, heptyl(meth)acrylate, 2-ethylhexyl(meth)acrylate, and n-octyl(meth)acrylate are preferable, and n-butyl(meth) acrylate, 2-ethylhexyl(meth)acrylate, or a combination thereof are more preferable.

The alkyl(meth)acrylate monomers may be used singly or may be used in combinations of two or more thereof.

The constituent unit derived from the alkyl(meth)acrylate monomer (A) is the main component of the pressure-sensitive adhesive layer, and the content thereof is generally 30 mass % or more, preferably 50 mass % or more, and more preferably 70 mass % or more, based on the total mass of the pressure-sensitive adhesive layer. Such a large content of the alkyl(meth)acrylate monomer (A) can impart the desirable adhesive force to the pressure-sensitive adhesive layer.

The content of the constituent unit derived from the alkyl(meth)acrylate monomer (A) in the pressure-sensitive adhesive layer is substantially the same as the content of the alkyl(meth)acrylate monomer (A) in a pressure-sensitive adhesive composition, which will be described later, and accordingly, the former can be expressed by replacing with the latter. The same also applies to the components other than the component (A), including the components (B) and (C), which will be described below.

(Polar Group-Containing Vinyl Monomer (B))

The polymerizable monomer preferably contains a polar group-containing vinyl monomer (B) in addition to the alkyl(meth)acrylate monomer (A). The polar group-containing vinyl monomer (B) has a polar group and a vinyl group. The adhesive force to an adherend is easily improved by using the polar group-containing vinyl monomer (B).

Examples of the polar group-containing vinyl monomer (B) include a vinyl carboxylate such as vinyl acetate; a vinyl group-containing carboxylic acid such as (meth)acrylic acid and itaconic acid, and an anhydride thereof; a vinyl monomer having a hydroxyl group such as 2-hydroxyethyl(meth) acrylate, 2-hydroxypropyl(meth)acrylate, 4-hydroxybutyl (meth)acrylate, caprolactone-modified(meth)acrylate, polyoxyethylene(meth)acrylate, and polyoxypropylene (meth)acrylate; and a nitrogen-containing vinyl monomer such as (meth)acrylonitrile, N-vinylpyrrolidone, N-vinylcaprolactam, N-vinyllaurilolactam, (meth)acryloylmorpholin, (meth)acrylamide, dimethyl(meth)acrylamide, N-methylol(meth)acrylamide, N-butoxy methyl(meth)acrylamide, and dimethylaminomethyl(meth)acrylate.

Among these, a vinyl group-containing carboxylic acid such as (meth)acrylic acid and itaconic acid, and an anhydride thereof are preferable. (meth)acrylic acid is more preferable, and acrylic acid is further preferable. These for the polar group-containing vinyl monomer (B) may be used singly or may be used in combinations of two or more thereof.

In a case where the polar group-containing vinyl monomer (B) is used, the content of the constituent unit derived from the polar group-containing vinyl monomer (B) in the pressure-sensitive adhesive layer is preferably 1 to 15 parts by mass, more preferably 2 to 12 parts by mass, and further preferably 3 to 10 parts by mass, per 100 parts by mass of the constituent unit derived from the alkyl (meth)acrylate monomer (A). The adhesive force to an adherend is easily improved when the content of the polar group-containing vinyl monomer (B) is within such a range.

(Olefin Polymer (C))

Preferably, the polymerizable monomer further includes an olefin polymer (C) having a polymerizable bond on either one end. The adhesive force to an adherend is easily improved by using such an olefin polymer (C).

The polymerizable bond means an unsaturated carbon-carbon bond that is capable of polymerizing with a polymerizable monomer. Examples thereof include an unsaturated double bond, and preferable examples thereof include a (meth)acryloyl group.

Examples of the olefin polymer (C) include a polyolefin having a (meth)acryloyl group on either one end. The polyolefin means a polymer of an aliphatic hydrocarbon compound having a double bond, such as ethylene, propylene, butane, butadiene, or isoprene, or a hydrogenated product thereof.

Examples of the polyolefin having a (meth)acryloyl group on either one end include a polyethylene having a (meth) acryloyl group on either one end that is prepared by reacting a polyethylene having an epoxy group on either one end with (meth)acrylic acid. Other examples include a polybutadiene having a (meth)acryloyl group on either one end and a hydrogenated product thereof, and examples of a commercially available product thereof include "L-1253" manufactured by KURARAY CO., LTD.

The olefin polymer (C) preferably has a number-average molecular weight of 500 to 20000, and more preferably 1000 to 10000. The number-average molecular weight may be measured by gel permeation chromatography (GPC) and calculated using a calibration curve of standard polystyrene.

The content of the constituent unit derived from the olefin polymer (C) in the pressure-sensitive adhesive layer is preferably 1 to 20 parts by mass, more preferably 2 to 15 parts by mass, and further preferably 4 to 12 parts by mass, per 100 parts by mass of the constituent unit derived from the alkyl(meth)acrylate monomer (A).

(Crosslinking Agent (D))

Preferably, the polymerizable monomer further includes a crosslinking agent. Example of the crosslinking agent include a polyfunctional monomer having two or more vinyl groups, and preferable examples include a polyfunctional (meth)acrylate having two or more (meth)acryloyl groups. The adhesive force of the pressure-sensitive adhesive layer is easily adjusted to fall within an appropriate range by using the polyfunctional monomer.

Examples of the polyfunctional (meth)acrylate include, but not limited to, hexanedol di(meth)acrylate, ethoxylated bisphenol A di(meth)acrylate, triacrylate of tris(2-hydroxyethyl)isocyanurate, ethoxylated trimethylolpropane triacrylate, proxyated trimethylolpropane triacrylate, proxiled glyceryl triacrylate, diacrylate of neopentyl glycol adipate, and also polymers, such as polyethylene glycol di(meth) acrylate, polypropylene glycol di(meth)acrylate, and liquid hydrogenated 1,2-polybutacliene di(meth)acrylate. Among these polyfunctional (meth)acrylates, the polymer is preferable, and liquid hydrogenated 1,2-polybutadiene di(meth) acrylate is more preferable. Examples of a commercially available product of liquid hydrogenated 1,2-polybutadiene di(meth)acrylate include "TEAI-1000" manufactured by NIPPON SODA CO., LTD.

The content of the constituent unit derived from the crosslinking agent in the pressure-sensitive adhesive layer is preferably 0.1 to 4 parts by mass, more preferably 0.3 to 3 parts by mass, and further preferably 0.5 to 2 parts by mass, per 100 parts by mass of the constituent unit derived from the alkyl(meth)acrylate monomer (A).

The photo-cured acrylic resin can be produced by irradiating the above-described polymerizable monomer with light. The irradiation with light is preferably irradiation with ultraviolet rays. In this case, it is preferred to add a photopolymerization initiator to the polymerizable monomer before irradiating with light.

The amount of the photopolymerization initiator blended is preferably 0.01 to 5 parts by mass, and more preferably 0.1 to 1 part by mass, per 100 parts by mass of the polymerizable monomer.

As the photopolymerization initiator, those used for producing an acrylic resin can be used without particular limitation. Examples of the photopolymerization initiator include a benzoin compounds such as benzoin, benzoin methyl ether, benzoin ethyl ether, and benzoin butyl ether; an acetophenone compound such as acetophenone, 2,2-dimethoxy-2-phenylacetophenone, 1,1-dichloroacetophenone, 4-(1-t-butyldioxy-1-methylethyl)acetophenone, 2-methyl-1-[4-(methylthio)phenyl]-2-morpholino-propane-1-one, and 2-benzyl-2-dimethylamino-1-(4-morpholinophenyl) butanone-1; an anthraquinone compounds such as 2-methylanthraquinone, 2-amylanthraquinone, 2-t-butylanthraquinone, and 1-chloroanthraquinone; a xanthone compounds such as xanthone, thioxanthone, 2,4-dimethylthioxanthone, 2,4-diisopropylthioxanthone, and 2-chlorothioxanthone; a ketal compound such as acetophenone dimethyl ketal and benzyl dimethyl ketal; a benzophenone compound such as benzophenone, 4-(1-t-butyldioxy-1-methylethyl)benzophenone, 3,3',4,4'-tetrakis(t-butyldioxycarbonyl)benzophenone; and an acylphosphine oxide compound.

<Tackifier Resin>

The pressure-sensitive adhesive layer may contain a tackifier resin in terms of improving the adhesive force. The tackifier resin is preferably a tackifier resin having less capability of inhibiting polymerization, including hydrogenated terpene resin, hydrogenated rosin, disproportionated rosin resin, and petroleum resin. Since a tackifier resin having many double bonds inhibits the polymerization reaction, a hydrogenated tackifier resin is preferable among the above, and a hydrogenated petroleum resin is particularly preferable.

The softening point of the tackifier resin may be about 95° C. or more in terms of improving the cohesive force and the adhesive force of the pressure-sensitive adhesive. The tackifier resin preferably includes that having a softening point of 120° C. or more, and for example, that having a softening point of 95° C. or more and less than 120° C. and that having a softening point of 120° C. or more and 150° C. or less may be used in combination. The softening point can be measured by the ring-and-ball test method defined by JIS K2207.

The content of the tackifier resin in the pressure-sensitive adhesive layer is preferably 5 to 40 parts by mass, more preferably 7 to 35 parts by mass, and further preferably 10 to 25 parts by mass, per 100 parts by mass of the constituent unit derived from the alkyl (meth)acrylate monomer (A).

<Fine particle>

The pressure-sensitive adhesive layer may contain a fine particle. The adhesive force can be improved when the fine particle is contained.

Examples of the fine particle include an inorganic hollow particles such as a glass balloon, a shirasu balloon, and a fly ash balloon; an organic hollow particles made of polymethyl methacrylate, acrylonitrile/vinylidene chloride copolymer, polystyrene, phenolic resin, etc.; an inorganic fine particle such as glass beads, silica beads, and synthetic mica; and an organic fine particle made of ethyl polyacrylic acid, polyurethane, polyethylene, polypropylene, etc.

The content of the fine particle in the pressure-sensitive adhesive layer is preferably 0.1 to 15 parts by mass, more preferably 0.5 to 10 parts by mass, and further preferably 0.7 to 5 parts by mass, per 100 parts by mass of the constituent unit derived from the alkyl(meth)acrylate monomer (A).

<Other Components>

In addition to the components described hereinabove, the pressure-sensitive adhesive layer used in the present invention may contain various additives conventionally used for a pressure-sensitive adhesive, including a plasticizer, a softener, a pigment, a dye, and a flame retardant.

<Thickness of Pressure-Sensitive Adhesive Layer>

The thickness of pressure-sensitive adhesive layer is preferably 100 to 3000 μm. The pressure-sensitive adhesive layer having a thickness of 100 μm or more delivers high anticorrosion performance when adhered to an adherend made of a metal material. On the other hand, a thickness of 3000 μm or less is expected to exhibit an improving effect on the anticorrosion performance according to the thickness.

The thickness of pressure-sensitive adhesive layer is more preferably 200 to 1500 μm, and further preferably 300 to 1000 μm.

<Method for Producing Pressure-Sensitive Adhesive Layer>

The pressure-sensitive adhesive layer can be obtained by irradiating a pressure-sensitive adhesive composition with light to polymerize the polymerizable monomer, the composition including the polymerizable monomer, the metal having a lower potential than that of iron, and the electroconductive material other than the metal, which have been described hereinabove. The pressure-sensitive adhesive composition may also include at least one from the tackifier resin, the fine particle, the photopolymerization initiator, and the other components, which have been described hereinabove, as necessary.

The method will be described more specifically below. First, to a reaction container, such as a glass container, are put the polymerizable monomer, the metal having a lower potential than that of iron, and the electroconductive material other than the metal, as well as the tackifier resin, the fine particle, the photopolymerization initiator, and the other components, which are added as necessary, and these are mixed to obtain a pressure-sensitive adhesive composition.

Next, in order to remove dissolved oxygen in the pressure-sensitive adhesive composition, an inert gas such as a nitrogen gas, generally, is fed thereto to purge oxygen. Then, the pressure-sensitive adhesive composition is applied to a release sheet or to, for example, a support such as a resin film, woven fabric, or non-woven fabric, and thereafter irradiated with light to polymerize the polymerizable monomer, thereby obtaining a pressure-sensitive adhesive layer.

The process from the application of or impregnation with the pressure-sensitive adhesive composition to the irradiation with light is preferably carried out in an inert gas atmosphere or in a condition that oxygen is blocked by a film or the like.

In this production method, the pressure-sensitive adhesive composition obtained by mixing the components may be pre-polymerized before application to the release sheet, the support, or the like, in order to increase the viscosity.

Examples of a lamp that can be used for irradiating the pressure-sensitive adhesive composition with light include a low-pressure mercury lamp, a medium-pressure mercury lamp, a high-pressure mercury lamp, an ultrahigh-pressure mercury lamp, a chemical lamp, a black light lamp, a microwave-excited mercury lamp, and a metal halide lamp. Among these, a chemical lamp is preferable. When the pressure-sensitive adhesive composition is irradiated with the light, preferable intensity of the irradiation with light depends on the presence or absence of the photopolymerization initiator and the other conditions, but is about 0.1 to 100 $mW/cm^2$.

[Pressure-Sensitive Adhesive Layer (Pressure-Sensitive Adhesive Layer of Pressure-Sensitive Adhesive Tape According to Second Invention)]

The pressure-sensitive adhesive tape according to the second invention in the present invention is a pressure-sensitive adhesive tape comprising a pressure-sensitive adhesive layer comprising a metal having a lower potential than that of iron and carbon nanotube.

The pressure-sensitive adhesive layer of the pressure-sensitive adhesive tape according to the second invention will be described below.

<Metal Having a Lower Potential than that of Iron>

The pressure-sensitive adhesive layer of the pressure-sensitive adhesive tape according to the second invention comprises a metal having a lower potential than that of iron. Since the metal having a lower potential than that of iron (hereinafter, also referred to as a "sacrificial protective metal") is contained, the pressure-sensitive adhesive layer has the sacrificial corrosion resistance, and increases the anticorrosive property of an adherend to which the pressure-sensitive adhesive tape of the present invention comprising the pressure-sensitive adhesive layer is attached. The sacrificial protective metal is dispersed in the pressure-sensitive adhesive forming the pressure-sensitive adhesive layer.

Examples of the sacrificial protective metal include cadmium, chrome, zinc, manganese, and aluminum. Among these, zinc and aluminum are preferable, and zinc is particularly preferable. When zinc is used, the sacrificial corrosion resistance is excellent.

The sacrificial protective metal, which is dispersed as a filler in the pressure-sensitive adhesive, may be in any form, such as a particulate form, a scale-like form, or a spindle-like form, and is preferably in a particulate form. The sacrificial protective metal in a particulate form is easily dispersed in the pressure-sensitive adhesive layer with almost no decrease in the pressure-sensitive adhesivity of the pressure-sensitive adhesive layer.

Herein, a particulate form means a form having a small ratio of the length in the major axial direction to the length in the minor axial direction (aspect ratio), and the aspect ratio is, for example, 3 or less, and is preferably 2 or less. The particulate form is not particularly limited and may be a spherical shape or irregular shape such as a powder. The above-described metal in a particulate form has a particle size of, for example, 1 to 500 μm, and preferably, 1 to 200 μm. The particle size herein means an average particle size determined by the laser diffraction method.

In a case where the pressure-sensitive adhesive layer is made with an acrylic resin, which will be described later, the content of the sacrificial protective metal is preferably 5 to 30 parts by mass, and more preferably 10 to 25 parts by mass, per 100 parts by mass of the constituent unit derived from the alkyl(meth)acrylate monomer (A).

The content of the sacrificial protective metal in the pressure-sensitive adhesive layer is preferably 3 to 25 mass %, and more preferably 7 to 20 mass %, based on the total mass of the pressure-sensitive adhesive layer.

When the sacrificial protective metal content is equal to or more than any of these lower limits, the anticorrosion performance is improved, and when the content is equal to or less than any of these upper limits, the adhesive force is improved.

<Carbon Nanotube>

The pressure-sensitive adhesive layer in the pressure-sensitive adhesive tape according to the second invention contains carbon nanotube. Since the carbon nanotube is contained, the sacrificial corrosion resistance of pressure-sensitive adhesive layer can be improved and the adhesive force can be maintained at a high level; accordingly, a pressure-sensitive adhesive tape having both the adhesive force and the sacrificial corrosion resistance at higher levels can be obtained easily. The reason for this is probably as follows: although carbon nanotube is an electroconductive material, the amount of carbon nanotube necessary for developing the sacrificial corrosion resistance at a certain level is smaller than that of other kinds of the electroconductive material, and thus the extent of the decrease in the adhesive force by carbon nanotube is smaller.

The carbon nanotube is a material in a tube form that is made of carbon. The carbon nanotube is excellent in the electrical properties, and can be combined with a resin or the like to form, for example, a sheet having a high electroconductivity. The carbon nanotube is a substance having a structure in which a graphite sheet is cylindrically rolled up, the graphite sheet having a carbon atomic arrangement in the form of a reticulated pattern of hexagons. A mono-layered roll is called a single-wall carbon nanotube, and a multi-layered roll is called a multi-wall carbon nanotube.

In the present invention, the kind of the carbon nanotube is not particularly limited, and may be any of a single-wall carbon nanotube, a multi-wall carbon nanotube, and a mixture including them in an arbitral ratio. The carbon nanotube can be used that are produced by any of various methods including an arc discharge method, a laser evaporation method, and a chemical vapor deposition method (CVD method).

The average diameter of the carbon nanotube is preferably 1 to 100 nm, and more preferably 2 to 15 nm. The average length of the carbon nanotube is preferably 0.1 to 1000 μm, and more preferably 10 to 500 μm. The aspect ratio (average length/average diameter) of the carbon nanotube is preferably 10 to 100000, and more preferably 500 to 30000.

The diameter of the carbon nanotube means the outer diameter in a case of a single-wall carbon nanotube, and the outer diameter of the outermost tube in a case of a multi-wall carbon nanotube. The diameter and the length of the carbon nanotube may be measured in an image obtained by observation under a transmission electron microscope (TEM), for example, and the average diameter and the average length may be determined as an arithmetic average on arbitral fifty nanotubes.

In a case where the pressure-sensitive adhesive layer is made with a pressure-sensitive acrylic adhesive, which will be described later, the content of the carbon nanotube is preferably 0.001 to 1 part by mass, and more preferably 0.005 to 0.1 parts by mass, per 100 parts by mass of the constituent unit derived from the alkyl(meth)acrylate monomer (A), which will be described later. The content of the carbon nanotube is further preferably 0.008 to 0.065 parts by mass, and further preferably 0.01 to 0.025 parts by mass, per 100 parts by mass of the constituent unit derived from the alkyl(meth)acrylate monomer (A).

The content of the carbon nanotube in the pressure-sensitive adhesive layer is preferably 0.0005 to 0.7 mass %, more preferably 0.005 to 0.05 mass %, and further preferably 0.006 to 0.045 mass %, based on the total mass of the pressure-sensitive adhesive layer.

When the carbon nanotube content is equal to or more than any of these lower limits, the sacrificial corrosion resistance is likely to be improved, and when the carbon nanotube content is equal to or less than any of these upper limits, the adhesive force is likely to be improved.

<Pressure-Sensitive Adhesive>

The pressure-sensitive adhesive layer in the pressure-sensitive adhesive tape according to the second invention is made with a pressure-sensitive adhesive. The kind of the pressure-sensitive adhesive is not particularly limited, and examples thereof include a pressure-sensitive acrylic adhesive, a pressure-sensitive rubber adhesive, a pressure-sensitive urethane adhesive, and a pressure-sensitive silicone adhesive. These may be used singly or may be used in combination.

The pressure-sensitive adhesive layer in the present invention is preferably made with the pressure-sensitive acrylic adhesive among them.

(Pressure-Sensitive Acrylic Adhesive)

One embodiment of the pressure-sensitive acrylic adhesive used for the pressure-sensitive adhesive layer in the present invention will be described in more detail below. The pressure-sensitive acrylic adhesive is a pressure-sensitive adhesive containing an acrylic polymer obtained by polymerizing a polymerizable monomer including an alkyl (meth)acrylate monomer (A).

The term "alkyl(meth)acrylate" herein has a concept encompassing both alkyl acrylate and alkyl methacrylate, and this is also applied to other similar terms mutatis mutandis. The term "polymerizable monomer" has a concept that may encompass not only a compound having no repeating unit but also a monomer itself having a repeating unit, such as an olefin polymer (C), which will be described later, as long as the monomer is a compound copolymerizable with the alkyl(meth)acrylate monomer (A).

(Alkyl(Meth)Acrylate Monomer (A))

The alkyl(meth)acrylate monomer (A) is an ester between (meth)acryl acid and an aliphatic alcohol, and is preferably an alkyl ester derived from an aliphatic alcohol having an alkyl group preferably having 2 to 14 carbon atoms, and more preferably 4 to 10 carbon atoms. When the number of carbon atoms of the alkyl group is within this range, the storage modulus at 40° C. and 5° C. and the adhesive force of the pressure-sensitive adhesive are easily adjusted to fall within the above-described range.

Specific examples of the alkyl(meth)acrylate monomer (A) include ethyl(meth)acrylate, n-propyl(meth)acrylate, isopropyl(meth)acrylate, n-butyl(meth)acrylate, isobutyl (meth)acrylate, t-butyl(meth)acrylate, pentyl(meth)acrylate, hexyl(meth)acrylate, heptyl(meth)acrylate, 2-ethylhexyl (meth)acrylate, n-octyl(meth)acrylate, isooctyl(meth)acrylate, nonyl(meth)acrylate, decyl(meth)acrylate, undecyl (meth)acrylate, dodecyl(meth)acrylate, tridecyl(meth) acrylate, and tetradecyl(meth)acrylate.

Among these, n-butyl(meth)acrylate, hexyl(meth)acrylate, heptyl(meth)acrylate, 2-ethylhexyl(meth)acrylate, and n-octyl(meth)acrylate are preferable, and n-butyl(meth) acrylate, 2-ethylhexyl(meth)acrylate, or a combination thereof are more preferable.

The alkyl(meth)acrylate monomers may be used singly or may be used in combinations of two or more thereof.

The constituent unit derived from the alkyl(meth)acrylate monomer (A) is the main component of the pressure-sensitive adhesive layer, and the content thereof is generally 30 mass % or more, preferably 50 mass % or more, and more preferably 70 mass % or more, based on the total mass of the pressure-sensitive adhesive layer. Such a large content of the alkyl(meth)acrylate monomer (A) can impart the desirable adhesive force to the pressure-sensitive adhesive layer.

The content of the constituent unit derived from the alkyl(meth)acrylate monomer (A) in the pressure-sensitive adhesive layer is substantially the same as the content of the alkyl (meth)acrylate monomer (A) in a pressure-sensitive adhesive composition, which will be described later, and accordingly, the former can be expressed by replacing with the latter. The same also applies to the components other than the component (A), including the components (B) and (C), which will be described below.

(Polar Group-Containing Vinyl Monomer (B))

The polymerizable monomer preferably contains a polar group-containing vinyl monomer (B) in addition to the alkyl(meth)acrylate monomer (A). The polar group-containing vinyl monomer (B) has a polar group and a vinyl group. The adhesive force to an adherend is easily improved by using the polar group-containing vinyl monomer (B).

Examples of the polar group-containing vinyl monomer (B) include a vinyl carboxylate such as vinyl acetate; a vinyl group-containing carboxylic acid such as (meth)acrylic acid and itaconic acid, and an anhydride thereof; a vinyl monomer having a hydroxyl group such as 2-hydroxyethyl(meth) acrylate, 2-hydroxypropyl(meth)acrylate, 4-hydroxybutyl (meth)acrylate, caprolactone-modified(meth)acrylate, polyoxyethylene(meth)acrylate, and polyoxypropylene (meth)acrylate; and a nitrogen-containing vinyl monomer such as (meth)acrylonitrile, N-vinylpyrrolidone, N-vinylcaprolactam, N-vinyllaurilolactam, (meth)acryloylmorpholin, (meth)acrylamide, dimethyl(meth)acrylamide, N-methylol(meth)acrylamide, N-butoxy methyl(meth)acrylamide, and dimethylaminomethyl(meth)acrylate.

Among these, a vinyl group-containing carboxylic acid such as(meth)acrylic acid and itaconic acid, and an anhydride thereof are preferable. (Meth)acrylic acid is more preferable, and acrylic acid is further preferable. These for the polar group-containing vinyl monomer (B) may be used singly or may be used in combinations of two or more thereof.

In a case where the polar group-containing vinyl monomer (B) is used, the content of the constituent unit derived from the polar group-containing vinyl monomer (B) in the pressure-sensitive adhesive layer is preferably 1 to 15 parts by mass, more preferably 2 to 12 parts by mass, and further preferably 3 to 10 parts by mass, per 100 parts by mass of the constituent unit derived from the alkyl (meth)acrylate monomer (A). The adhesive force to an adherend is easily improved when the content of the polar group-containing vinyl monomer (B) is within such a range.

(Olefin Polymer (C))

Preferably, the polymerizable monomer further includes an olefin polymer (C) having a polymerizable bond on either one end. The adhesive force to an adherend is easily improved by using such an olefin polymer (C).

The polymerizable bond means an unsaturated carbon-carbon bond that is capable of polymerizing with a polymerizable monomer. Examples thereof include an unsaturated double bond, and preferable examples thereof include a (meth)acryloyl group.

Examples of the olefin polymer (C) include a polyolefin having a (meth)acryloyl group on either one end. The polyolefin means a polymer of an aliphatic hydrocarbon compound having a double bond, such as ethylene, propylene, butane, butadiene, or isoprene, or a hydrogenated product thereof.

Examples of the polyolefin having a (meth)acryloyl group on either one end include a polyethylene having a (meth) acryloyl group on either one end that is prepared by reacting a polyethylene having an epoxy group on either one end with (meth)acrylic acid. Other examples include a polybutadiene having a (meth)acryloyl group on either one end and a hydrogenated product thereof, and examples of a commercially available product thereof include "L-1253" manufactured by KURARAY CO., LTD.

The olefin polymer (C) preferably has a number-average molecular weight of 500 to 20000, and more preferably 1000 to 10000. The number-average molecular weight may be measured by gel permeation chromatography (GPC) and calculated using a calibration curve of standard polystyrene.

The content of the constituent unit derived from the olefin polymer (C) in the pressure-sensitive adhesive layer is preferably 1 to 20 parts by mass, more preferably 2 to 15 parts by mass, and further preferably 4 to 12 parts by mass, per 100 parts by mass of the constituent unit derived from the alkyl(meth)acrylate monomer (A).

(Crosslinking Agent (D))

Preferably, the polymerizable monomer further includes a crosslinking agent. Example of the crosslinking agent include a polyfunctional monomer having two or more vinyl groups, and preferable examples include polyfunctional (meth)acrylate having two or more (meth)acryloyl groups. The adhesive force of the pressure-sensitive adhesive layer is easily adjusted to fall within an appropriate range by using the polyfunctional monomer.

Examples of the polyfunctional (meth)acrylate include, but not limited to, hexanediol di(meth)acrylate, ethoxylated bisphenol A di(meth)acrylate, triacrylate of tris(2-hydroxyethyl)isocyanurate, ethoxylated trimethylolpropane triacrylate, proxyated trimethylolpropane triacrylate, proxiled glyceryl triacrylate, diacrylate of neopentyl glycol adipate, and also polymers, such as polyethylene glycol di(meth) acrylate, polypropylene glycol di(meth)acrylate, and liquid hydrogenated 1,2-polybutadiene di(meth)acrylate. Among these polyfunctional (meth)acrylates, the polymer is preferable, and liquid hydrogenated 1,2-polybutadiene di(meth) acrylate is more preferable. Examples of a commercially available product of liquid hydrogenated 1,2-polybutadiene di(meth)acrylate include "TEAI-1000" manufactured by NIPPON SODA CO., LTD.

The content of the constituent unit derived from the crosslinking agent in the pressure-sensitive adhesive layer is preferably 0.1 to 4 parts by mass, more preferably 0.3 to 3 parts by mass, and further preferably 0.5 to 2 parts by mass, per 100 parts by mass of the constituent unit derived from the alkyl(meth)acrylate monomer (A).

(Tackifier Resin)

The pressure-sensitive acrylic adhesive may contain a tackifier resin in terms of improving the adhesive force. The tackifier resin is preferably a tackifier resin having less capability of inhibiting polymerization, including hydrogenated terpene resin, hydrogenated rosin, disproportionated rosin resin, and petroleum resin. Since a tackifier resin having many double bonds inhibits the polymerization reaction, a hydrogenated tackifier resin is preferable among the above, and a hydrogenated petroleum resin is particularly preferable.

The softening point of the tackifier resin may be about 95° C. or more in terms of improving the cohesive force and the adhesive force of the pressure-sensitive adhesive. The tackifier resin preferably includes that having a softening point of 120° C. or more, and for example, that having a softening point of 95° C. or more and less than 120° C. and that having a softening point of 120° C. or more and 150° C. or less may be used in combination. The softening point can be measured by the ring-and-ball test method defined by JIS K2207.

The content of the tackifier resin in the pressure-sensitive acrylic adhesive is preferably 5 to 40 parts by mass, more preferably 7 to 35 parts by mass, and further preferably 10 to 25 parts by mass, per 100 parts by mass of the constituent unit derived from the alkyl (meth)acrylate monomer (A).

The pressure-sensitive acrylic adhesive may contain a fine particle. The adhesive force can be improved when the fine particle is included.

Examples of the fine particle include an inorganic hollow particles such as a glass balloon, a shirasu balloon, and a fly ash balloon; an organic hollow particles made of polymethyl methacrylate, acrylonitrile/vinylidene chloride copolymer, polystyrene, phenolic resin, etc.; an inorganic fine particle such as glass beads, silica beads, and synthetic mica; and an organic fine particle made of ethyl polyacrylic acid, polyurethane, polyethylene, polypropylene, etc.

The content of the fine particle in the pressure-sensitive acrylic adhesive is preferably 0.1 to 15 parts by mass, more preferably 0.5 to 10 parts by mass, and further preferably 0.7 to 5 parts by mass, per 100 parts by mass of the constituent unit derived from the alkyl (meth)acrylate monomer (A).

(Other Components)

In addition to the components described hereinabove, the pressure-sensitive acrylic adhesive used in the present invention may contain various additives conventionally used for a pressure-sensitive adhesive, including a plasticizer, a softener, a pigment, a dye, and a flame retardant.

(Method for Producing Pressure-Sensitive Acrylic Adhesive and Pressure-Sensitive Adhesive Layer)

The pressure-sensitive acrylic adhesive can be obtained by irradiating a pressure-sensitive adhesive composition with light to polymerize the polymerizable monomer, the composition including the polymerizable monomer, the sacrificial protective metal, and the carbon nanotube, which have been described hereinabove. The pressure-sensitive adhesive composition may include at least one from the tackifier resin, the fine particle, and the other components, which have been described hereinabove, as necessary.

The method will be described more specifically below. First, to a reaction container, such as a glass container, are put the polymerizable monomer, the sacrificial protective metal, and the carbon nanotube, as well as the tackifier resin, the fine particle, and the other components, which are added as necessary, and these are mixed to obtain a pressure-sensitive adhesive composition.

Next, in order to remove dissolved oxygen in the pressure-sensitive adhesive composition, an inert gas such as a nitrogen gas, generally, is fed thereto to purge oxygen. Then, the pressure-sensitive adhesive composition is applied to a release sheet or to, for example, a support such as a resin film, woven fabric, or non-woven fabric, and thereafter irradiated with light to polymerize the polymerizable monomer, thereby obtaining an anticorrosive pressure-sensitive adhesive layer.

The process from the application of or impregnation with the pressure-sensitive adhesive composition to the irradiation with light is preferably carried out in an inert gas atmosphere or in a condition that oxygen is blocked by a film or the like.

In this production method, the pressure-sensitive adhesive composition obtained by mixing the components may be pre-polymerized before application to the release sheet, the support, or the like, in order to increase the viscosity.

(Pressure-Sensitive Rubber Adhesive)

Next, the pressure-sensitive rubber adhesive used for the pressure-sensitive adhesive layer will be described. The pressure-sensitive rubber adhesive contains a rubber component and a tackifier resin. As the rubber component, a styrene/isoprene block copolymer is preferably used. The styrene/isoprene block copolymer preferably has a diblock ratio of 25 to 70 mass %, more preferably 30 to 65 mass %, and further preferably 45 to 60 mass %. The diblock here refers to a diblock composed of styrene and isoprene. When the diblock ratio is within the above-described range, the adhesive force is easily enhanced. In addition to the diblock, the styrene/isoprene block copolymer also includes those having three or more blocks, such as a triblock composed of styrene, isoprene, and styrene blocks.

The amount of styrene in the styrene/isoprene block copolymer is not particularly limited, and preferably 14 to 24 mass %, and more preferably 15 to 18 mass %. When the amount of styrene is 14 mass % or more, the pressure-sensitive adhesive having a high cohesive is easily obtained. When the amount of styrene is 24 mass % or less, the pressure-sensitive adhesive has a cohesive force at an appropriate level to easily exhibit an adhesive force.

The molecular weight of the styrene/isoprene block copolymer is not particularly limited, and the weight-average molecular weight thereof is preferably 100,000 to 400,000, and more preferably 150,000 to 250,000. The weight-average molecular weight as used herein refers to that measured as a molecular weight in terms of polystyrene by the gel permeation chromatography (GPC) method.

Various tackifier resins can be used as the tackifier resin used for the pressure-sensitive rubber adhesive, and preferably, a petroleum-based resin, a terpene resin, or a kumaron resin is used. The tackifier resins can be used singly or in combinations of two or more thereof, and it is preferable to use a petroleum-based resin in combination with at least one selected from a terpene resin and a kumaron resin. Such combinations of the tackifier resins are likely to render the adhesive force great.

Examples of the petroleum-based resin include an aliphatic petroleum resin (C5 petroleum resin), an alicyclic petroleum resin, and an aromatic petroleum resin, and the aliphatic petroleum resin is preferable in terms of the compatibility with the styrene/isoprene block copolymer. It is preferable to use a petroleum-based resin having a softening point of about 90 to 120° C.

As the terpene resin, one having a softening point of about 80 to 120° C. can be used, and one having a softening point less than 100° C. is preferable in terms of securing the adhesive force. As the kumaron resin, one preferably having a softening point of 110 to 130° C., more preferably 115 to 125° C. is used in order to secure the cohesive force.

The amount of the tackifier resin is preferably 60 to 250 parts by mass, more preferably 100 to 200 parts by mass, and further preferably 110 to 180 parts by mass, per 100 parts by mass of the rubber component. When the amount of the tackifier resin blended is within the above-described range, the cohesive force can be greater so that an appropriate adhesive force can be imparted.

When the petroleum-based resin is used in combination with at least one selected from the terpene resin and the kumaron resin, the amount of the petroleum-based resin is preferably 50 to 200 parts by mass, preferably 60 to 150 parts by mass, and more preferably 60 to 110 parts by mass, per 100 parts by mass of the rubber component. On the other hand, the amount of the terpene resin is preferably 10 to 70 parts by mass, more preferably 20 to 60 parts by mass, and further preferably 30 to 50 parts by mass, per 100 parts by mass of the rubber component. The amount of the kumaron resin is preferably 10 to 60 parts by mass, more preferably 15 to 50 parts by mass, and further preferably 20 to 40 parts by mass, per 100 parts by mass of the rubber component.

As in the pressure-sensitive acrylic adhesive, the pressure-sensitive rubber adhesive may contain the fine particle described hereinbefore, and the pressure-sensitive rubber adhesive may also contain a sacrificial protective metal, an electroconductive material, a softener, an antioxidant, a filler, and the like, as necessary.

(Pressure-Sensitive Urethane Adhesive)

The pressure-sensitive urethane adhesive described above is not particularly limited, and examples thereof include a urethane resin obtained by reacting at least a polyol and a polyisocyanate compound. Examples of the polyol include a polyether polyol, a polyester polyol, a polycarbonate polyol, and a polycaprolactone polyol. Examples of the polyisocyanate compound include diphenylmethane diisocyanate, tolylene diisocyanate, and hexamethylene diisocyanate. These pressure-sensitive urethane adhesives may be used singly or in combinations of two or more thereof.

A urethane resin obtained by reacting a polyurethane polyol and a polyfunctional isocyanate-based curing agent may also be used as the pressure-sensitive urethane adhesive. Examples of the polyurethane polyol include a reaction product of the above-described polyol and polyisocyanate compound, and a reaction product of the polyol, the polyisocyanate compound, and a chain extender such as a diamine. The polyfunctional isocyanate-based curing agent may be a compound having two or more isocyanate groups, and the isocyanate compound described above may be used therefor.

The pressure-sensitive urethane adhesive may contain the fine particle described hereinbefore in addition to the urethane resin, and the pressure-sensitive urethane adhesive may also contain a tackifier resin, a sacrificial protective metal, an electroconductive material, a softener, an antioxidant, and a filler, and the others, if necessary.

(Pressure-Sensitive Silicone Adhesive)

Examples of the pressure-sensitive silicone adhesive include pressure-sensitive silicone adhesives of addition reaction-type, peroxide curing-type, and condensation reaction-type. Among these, the pressure-sensitive silicone adhesive of addition reaction-type is preferably used in terms of curability at a low temperature for a short time. The pressure-sensitive silicone adhesive of condensation reaction type is cured while the pressure-sensitive adhesive layer is formed. When the pressure-sensitive silicone adhesive of condensation-reaction type is used as the pressure-sensitive silicone adhesive, the pressure-sensitive silicone adhesive may include a catalyst such as a platinum catalyst.

The pressure-sensitive silicone adhesive may contain a fine particle, and a crosslinking agent and various additives for controlling the adhesive force may also be added thereto.

<Physical Properties of Pressure-Sensitive Adhesive Layer>

(Total Light Transmittance)

The pressure-sensitive adhesive layer in the pressure-sensitive adhesive tape according to the second invention has a total light transmittance X, per micrometer of a thickness thereof, of 99.85% or less. When the total light transmittance X is 99.85% or less, the sacrificial corrosion resistance is better, which can easily prevent corrosion of an adherend with the pressure-sensitive adhesive tape. The total light transmittance X is preferably 99.83% or less, more preferably 99.8% or less, and further preferably 99.7% or less, in view of improving the sacrificial corrosion resistance. In a case where a pressure-sensitive acrylic adhesive is used, the total light transmittance X is preferably 97% or more and more preferably 98% or more, in terms of improving the curability of the whole of the pressure-sensitive adhesive layer. The total light transmittance X can be adjusted by the kind and content of the carbon nanotube, for example.

The total light transmittance X (%) per micrometer of the thickness can be calculated using the following expression from the total light transmittance Y (%) and the thickness T (μm) of the pressure-sensitive adhesive layer.

[Expression 2]

$$\underset{(\%)}{\text{Total light transmittance } Y} = 100 \times \left( \frac{\text{Total light transmittance } X}{100} \right)^T$$

The total light transmittance Y is a value measured in accordance with JIS K7361-1. The total light transmittance can be measured in an atmosphere at 23° C. and a humidity of 50% with a haze mater (e.g., Haze Meter NDH4000 manufactured by NIPPON DENSHOKU INDUSTRIES Co., Ltd.).

(Potential of Pressure-Sensitive Adhesive Layer)

The pressure-sensitive adhesive layer preferably has a potential of −700 mV or less, more preferably −750 mV or less, and further preferably −800 mV or less, in a sacrificial protection test. A lower potential is more favorable in view of the sacrificial corrosion resistance; however, the potential is preferably −900 mV or more, taking into account the balance between the sacrificial corrosion resistance and the adhesive force. The potential of the pressure-sensitive adhesive layer in the sacrificial protection test can be adjusted by the kinds and amounts of the metal having a lower potential than that of iron and the electroconductive material, for example.

The sacrificial protection test is carried out by the following (1) and (2).

(1) A pressure-sensitive adhesive layer with a size of 150 mm×70 mm is attached to a steel plate SS400 (manufactured by TP Giken Corporation, 150 mm×70 mm) as an adherend.

(2) Thereafter, part (2 mm×2 mm) of the pressure-sensitive adhesive layer is cut out, and a NaCl aqueous solution having a concentration of 3 mass % is dropped thereon. A silver/silver chloride electrode is placed such that the tip of the electrode contacts with the NaCl aqueous solution, and the potential is measured using the electrode.

It is recommended that in the measurement of the potential, a digital multimeter "CDM-11D" (manufactured by CUSTOM corporation) is used as a tester, and that the negative electrode thereof is connected with an electrode "HS-205C" (manufactured DKK-TOA CORPORATION) via an electrode clip and used.

(Resistance Value of Pressure-Sensitive Adhesive Layer)

The resistance value of the pressure-sensitive adhesive layer is not particularly limited, but is preferably $1\times10^{10}$ to $1\times10^{16}\Omega$, more preferably $5\times10^{10}$ to $5\times10^{15}\Omega$, and further preferably $1\times10^{11}$ to $1\times10^{15}\Omega$. Generally, when the resistance value of the pressure-sensitive adhesive layer is low (for example, $1\times10^{8}\Omega$ or less), the transfer of electrons to an adherend is likely to occur, and accordingly, the anticorrosion performance is easily improved. However, the pressure-sensitive adhesive layer in the present invention exhibits the anticorrosion performance even when the resistance value is relatively high as described above. The reason for this is probably that the pressure-sensitive adhesive layer in the present invention includes the carbon nanotube together with the sacrificial protection metal. In addition, when the resistance value of the pressure-sensitive adhesive layer is within the above-described range, the adhesive force can be improved.

(Thickness)

The thickness of pressure-sensitive adhesive layer is preferably 100 to 3000 μm. The pressure-sensitive adhesive layer having a thickness of 100 μm or more delivers high anticorrosion performance when adhered to an adherend made of a metal material. On the other hand, a thickness of 3000 μm or less is expected to exhibit an improving effect on the anticorrosion performance according to the thickness. The thickness of pressure-sensitive adhesive layer is more preferably 200 to 1500 μm, and further preferably 300 to 1000 μm.

<Structure of Pressure-Sensitive Adhesive Tape>

The pressure-sensitive adhesive tape of the present invention comprises the above-described pressure-sensitive adhesive layer. The pressure-sensitive adhesive tape according to the first invention and the pressure-sensitive adhesive tape according to the second invention each may be a pressure-sensitive adhesive single coated tape having a support and the pressure-sensitive adhesive layer provided on a single side of the support, or may be a pressure-sensitive adhesive double sided tape having a support and pressure-sensitive adhesive layers provided on both sides of the support. The pressure-sensitive adhesive tape may consist of a pressure-sensitive adhesive layer (in other words, may be a pressure-sensitive adhesive layer alone), which is so-called a supportless pressure-sensitive adhesive double sided tape. Among these, the pressure-sensitive adhesive tape of the present invention is preferably a pressure-sensitive adhesive double sided tape consisting of a pressure-sensitive adhesive layer.

Generally, a release sheet is attached to the surface of the pressure-sensitive adhesive layer of the pressure-sensitive adhesive tape, and the pressure-sensitive adhesive tape is adhered to an adherend after peeling the release sheet. The release sheet used may be that obtained by release treatment on one side of a resin film with a release agent such as a silicone release agent, for example, and the release sheet is attached such that the release-treated side contacts with the pressure-sensitive adhesive layer.

Examples of the support of the pressure-sensitive single coated adhesive tape and the pressure-sensitive adhesive double sided tape include non-woven fabric, paper such as Japanese paper, woven fabric made of natural fiber, synthetic fiber, or the like, a resin film made of polyester, polyolefin, soft polyvinyl chloride, hard polyvinyl chloride, acetate, or the like, and a flat yarn cloth. The flat yarn cloth is obtained by placing flat yarn made of a synthetic resin such as a polyolefin resin in a grid pattern of bi-, tri-, or tetra-axes and bonding at the intersects.

The pressure-sensitive adhesive tape of the present invention is excellent in the adhesive force and the sacrificial corrosion resistance, and is thus preferably used as a pressure-sensitive adhesive tape for anticorrosion (hereinafter, referred to as the anticorrosive pressure-sensitive adhesive tape). The anticorrosive pressure-sensitive adhesive tape is preferably adhered to the surface of an adherend made of any of various metal materials when in use. The metal material is preferably that containing at least one selected from the group consisting of iron and an alloy including iron. Specific examples of the alloy including iron include various steel materials, including alloy steels such as nickel chromium steel, nickel chrome molybdenum steel, chrome steel, chrome molybdenum steel, and manganese steel, and carbon steel. Steel materials are used for steel structures such as bridges, steel towers, viaducts, tanks, plants, piers, etc., and accordingly, the anticorrosive pressure-sensitive adhesive tape of the present invention is preferably used for anticorrosive application to steel structures.

EXAMPLES

The present invention will now be described in more detail by way of examples, but the present invention is not limited to these examples.

[Pressure-Sensitive Adhesive Tape According to First Invention]

The pressure-sensitive adhesive tape according to the first invention will be described below by way of examples.

[Total Light Transmittance]

The total light transmittance of the pressure-sensitive adhesive layer prepared in each of Examples and Comparative Examples was measured in the following manner.

The total light transmittance Y of the pressure-sensitive adhesive layer was measured in accordance with JIS K7361-1. Specifically, the total light transmittance Y was measured in an atmosphere at 23° C. and a humidity of 50% with a haze mater (e.g., Haze Meter NDH4000 manufactured by NIPPON DENSHOKU INDUSTRIES Co., Ltd.).

The total light transmittance X (%) per micrometer of the thickness was calculated using the following expression from the total light transmittance Y (%) and the thickness T (μm) of the pressure-sensitive adhesive layer.

[Expression 3]

$$\underset{(\%)}{\text{Total light transmittance } Y} = 100\times\left(\frac{\text{Total light transmittance } X}{100}\right)^{T}$$

[Sacrificial Protection Test]

The sacrificial protection test was carried out by the following (1) and (2).

(1) A pressure-sensitive adhesive layer with a size of 150 mm×70 mm was attached to a steel plate SS400 (manufactured by TP Giken Corporation, 150 mm×70 mm) as an adherend.

(2) Thereafter, part (2 mm×2 mm) of the pressure-sensitive adhesive layer was cut out, and a NaCl aqueous solution having a concentration of 3 mass % was dropped thereon. A silver/silver chloride electrode was placed such that the tip of the electrode contacts with the NaCl aqueous solution, and the potential was measured using the electrode.

In the measurement of the potential, a digital multimeter "CDM-11D" (manufactured by CUSTOM corporation) was used as a tester, and the negative electrode thereof was connected with an electrode "HS-205C" (manufactured DKK-TOA CORPORATION) via an electrode clip and used.

The sacrificial corrosion resistance was evaluated according to the following criteria on the basis of the result obtained by the above sacrificial protection test. "Good" means that the potential is low and that the sacrificial corrosion resistance is thus excellent, and "Poor" means that the potential is high and that the sacrificial corrosion resistance is thus poor.

(Evaluation)

Good: Potential is −700 mV or less

Poor: Potential is more than −700 mV

[Adhesive Force Loss]

For the pressure-sensitive adhesive layer (pressure-sensitive adhesive double sided tape) prepared in each of Examples and Comparative Examples, the adhesive force on the side irradiated with ultraviolet rays (the adhesive force on the irradiated side) and the adhesive force on the other side of the side irradiated with ultraviolet rays (the adhesive force on the other side) were measured in the following manner.

The pressure-sensitive adhesive layer obtained in each example was cut into a size of 25 mm×100 mm, which was adhered to a SUS plate to obtain a measurement sample. The measurement sample was fixed to the chucks of a tensile tester ("TENSILON Universal Material Testing Instrument, manufactured by A&D Company, Limited). Then, the pressure-sensitive adhesive layer was pulled over 60 mm or more at a peeling angle of 180° and a rate of 300 mm/min, and an average value of loads (N) detected over that interval by the load cell was recorded, which was used as the adhesive force.

The above test was carried out on both sides of the pressure-sensitive adhesive layer to obtain the value of the adhesive force on the irradiated side and that on the other side. The adhesive force loss was determined using the expression below, which was evaluated according to the following criteria. "Good" means that the adhesive force loss is small and that the adhesive force of the pressure-sensitive adhesive layer is thus large. "Poor" means that the adhesive force loss is large and that the adhesive force of the pressure-sensitive adhesive layer is thus small.

Adhesive force loss (%)=100×(adhesive force of irradiated side-adhesive force of other side)/(adhesive force of irradiated side)

(Evaluation)

Good: Adhesive force loss is 40% or less

Fair: Adhesive force loss is more than 40% and 50% or less

Poor: Adhesive force loss is more than 50%

[Total Evaluation]

Good: "Poor" was given in neither the evaluation in the sacrificial protection test nor that in the adhesive force loss.

Poor: "Poor" was given in at least one of the evaluation in the sacrificial protection test and that in the adhesive force loss.

Example 1

A pressure-sensitive adhesive composition was prepared according to the formulation described in Table 1. Purge with nitrogen gas was carried on the pressure-sensitive adhesive composition to remove dissolved oxygen. Then, a spacer having a thickness of 600 μm was placed on the release-treated side of a release sheet, and the pressure-sensitive adhesive composition was applied to the release-treated side of the release sheet. Then, the applied pressure-sensitive adhesive composition was covered with another release sheet such that the release-treated side thereof was brought into contact with the pressure-sensitive adhesive composition. The release sheets used were each a PET film (thickness 50 μm) that had undergone mold-release treatment with silicone.

In that state, the lamp intensity of the chemical lamp was adjusted such that the intensity of irradiation with ultraviolet rays was 5 $mW/cm^2$ on the release sheet on the cover side, and one side was irradiated with ultraviolet rays for 15 minutes to obtain an anticorrosive pressure-sensitive adhesive double sided tape consisting of a pressure-sensitive adhesive layer alone with release sheets attached to both sides thereof. The thickness of the pressure-sensitive adhesive layer (that is, the pressure-sensitive adhesive double sided tape) was 600 μm. The results are shown in Table 1.

Examples 2 to 6, Comparative Examples 1 to 3

An anticorrosive pressure-sensitive adhesive double sided tape was obtained in the same manner as in Example 1, except for preparing a pressure-sensitive adhesive composition according to the formulation described in Table 1. The results are shown in Table 1.

TABLE 1

| | | Example | | | | | | Comparative Example | | |
|---|---|---|---|---|---|---|---|---|---|---|
| | | 1 | 2 | 3 | 4 | 5 | 6 | 1 | 2 | 3 |
| Pressure-sensitive adhesive composition (parts by weight) | 2-Ethylhexyl acrylate | 85 | 85 | 85 | 85 | 85 | 85 | 85 | 85 | 85 |
| | n-Butyl acrylate | 15 | 15 | 15 | 15 | 15 | 15 | 15 | 15 | 15 |
| | Acrylic acid | 5 | 5 | 5 | 5 | 5 | 5 | 5 | 5 | 5 |
| | Olefin polymer | 10 | 10 | 10 | 10 | 10 | 10 | 10 | 10 | 10 |
| | Crosslinking agent | 1 | 1 | 1 | 1 | 1 | 1 | 1 | 1 | 1 |
| | Tackifier resin 1 | 5 | 5 | 5 | 5 | 5 | 5 | 5 | 5 | 5 |
| | Tackifier resin 2 | 5 | 5 | 5 | 5 | 5 | 5 | 5 | 5 | 5 |
| | Fine particle | 0.8 | 0.8 | 0.8 | 0.8 | 0.8 | 0.8 | 0.8 | 0.8 | 0.8 |
| | Metal having a lower potential than that of iron (zinc particle) | 15 | 15 | 15 | 15 | 15 | 15 | 0 | 15 | 15 |
| | Electroconductive material (CNT) | 0.01 | 0.025 | 0.05 | 0.06 | 0.01 | 0.5 | 0.025 | 0 | 0 |
| | Electroconductive material (carbon black) | 0 | 0 | 0 | 0 | 0 | 0 | 0 | 0 | 4 |
| | Dispersant | 0.01 | 0.025 | 0.05 | 0.06 | 0.01 | 0.5 | 0.025 | 0 | 0 |
| | Polymerization initiator | 0.2 | 0.2 | 0.2 | 0.2 | 0.2 | 0.2 | 0.2 | 0.2 | 0.2 |
| Physical properties of pressure-sensitive adhesive layer | Thickness (μm) | 600 | 600 | 600 | 600 | 1500 | 100 | 600 | 600 | 600 |
| | Total light transmittance X (%) (per micrometer of thickness) | 99.83 | 99.77 | 99.65 | 99.56 | 99.83 | 97.38 | 99.80 | 99.90 | 99.30 |
| | Total light transmittance Y (%) (whole thickness) | 36 | 25 | 12 | 7 | 8 | 7 | 30 | 55 | 1 |
| Evaluations | Sacrificial protection test: potential (mV) | −750 | −850 | −860 | −900 | −750 | −950 | −500 | −550 | −750 |
| | Sacrificial protection test: evaluation | Good | Good | Good | Good | Good | Good | Poor | Poor | Good |
| | Adhesive force on irradiated side (N/25 mm) | 55 | 50 | 42 | 37 | 60 | 30 | 50 | 55 | 30 |
| | Adhesive force on other side of irradiated side (N/25 mm) | 55 | 50 | 34 | 19 | 33 | 16 | 50 | 55 | 6 |

TABLE 1-continued

| | Example | | | | | | Comparative Example | | |
|---|---|---|---|---|---|---|---|---|---|
| | 1 | 2 | 3 | 4 | 5 | 6 | 1 | 2 | 3 |
| Adhesive force loss (%) | 0 | 0 | 20 | 48 | 45 | 48 | 0 | 0 | 80 |
| Adhesive force loss Evaluations | Good | Good | Good | Fair | Fair | Fair | Good | Good | Poor |
| Total evaluation | Good | Good | Good | Good | Good | Good | Poor | Poor | Poor |

Each of the components in Table 1 are as follows.

Olefin polymer: product name "L-1253", manufactured by KURARAY CO., LTD., hydrogenated polybutadiene having a (meth)acryloyl group at one end.

Crosslinking agent: product name "TEAI-1000", manufactured by NIPPON SODA CO., LTD.

Tackifier resin 1: product name "ARKON P140", manufactured by Arakawa Chemical Industries, Ltd., hydrogenated petroleum resin, softening point 140° C.

Tackifier resin 2: product name "ARKON P100", manufactured by Arakawa Chemical Industries, Ltd., hydrogenated petroleum resin, softening point 100° C.

Fine particle: product name "Cel-star Z-27", manufactured by Tokai Kogyo, K. K., glass balloon Zinc particle: product name "Zinc powder #40", manufactured by SAKAI CHEMICAL INDUSTRY CO., LTD., average particle size 50 μm Electroconductive material: carbon nanotube (CNT), product name "JENOTUBE 8A", manufactured by JEIO, average diameter 6 to 9 nm, average length 100 to 200 μm Electroconductive material: carbon black, product name "AT-NO.15S", manufactured by Oriental Industry Co. LTD.

Dispersant: product name "S-LEC BX-L", manufactured by SEKISUI CHEMICAL CO., LTD., polyvinyl butyral resin Polymerization initiator: 2,2-dimethoxy-2-phenylacetophenone The pressure-sensitive adhesive tapes according to Examples 1 to 6 were each an inventive pressure-sensitive adhesive tape, which has pressure-sensitive adhesive layer including a photo-cured acrylic resin, a metal having a lower potential than that of iron, and an electroconductive material other than the metal, and having total light transmittance X and Y within respective predetermined ranges. These pressure-sensitive adhesive tapes were excellent in the sacrificial corrosion resistance, and also showed a small adhesive force loss and therefore a great adhesive force.

In contrast, the pressure-sensitive adhesive tapes according to Comparative Examples 1 to 3 were each a pressure-sensitive adhesive tape that does not satisfy the requirements of the present invention, and were inferior in at least one of the sacrificial corrosion resistance and the adhesive force.

[Pressure-Sensitive Adhesive Tape According to Second Invention]

The pressure-sensitive adhesive tape according to the second invention will be described below by way of examples.

[Sacrificial Protection Test]

The sacrificial protection test was carried out by the following (1) and (2).

(1) A pressure-sensitive adhesive layer with a size of 150 mm×70 mm was attached to a steel plate SS400 (manufactured by TP Giken Corporation, 150 mm×70 mm) as an adherend.

(2) Thereafter, part (3 mm×3 mm) of the pressure-sensitive adhesive layer was cut out, and a NaCl aqueous solution having a concentration of 3 mass % was dropped thereon. A silver/silver chloride electrode was placed such that the tip of the electrode contacts with the NaCl aqueous solution, and the potential was measured using the electrode.

In the measurement of the potential, a digital multimeter "CDM-11D" (manufactured by CUSTOM corporation) was used as a tester, and the negative electrode thereof was connected with an electrode "HS-205C" (manufactured DKK-TOA CORPORATION) via an electrode clip and used.

The sacrificial corrosion resistance was evaluated according to the following criteria on the basis of the results obtained by the above sacrificial protection test. "Good" means that the potential is low and that the sacrificial corrosion resistance is thus excellent, and "Poor" means that the potential is high and that the sacrificial corrosion resistance is thus poor.

(Evaluation)

Good: Potential is −700 mV or less

Poor: Potential is more than −700 mV

[Adhesive Force]

For the pressure-sensitive adhesive layer (pressure-sensitive adhesive double sided tape) prepared in each of Examples and Comparative Examples, the adhesive force was measured in the following manner. The measurement of the adhesive force was carried out on the other side of the side irradiated with ultraviolet rays of the pressure-sensitive adhesive layer, and the result is described in Table 2 as the adhesive force on the other side.

The pressure-sensitive adhesive layer obtained in each example was cut into a size of 100 mm×25 mm, which was adhered to a SUS plate to obtain a measurement sample. The measurement sample was fixed to the chucks of a tensile tester ("TENSILON Universal Material Testing Instrument, manufactured by A&D Company, Limited). Then, the pressure-sensitive adhesive layer was pulled over 60 mm or more at a peeling angle of 180° and a rate of 300 mm/min, and an average value of loads (N) detected over that interval by the load cell was recorded, which was used as the adhesive force (N/25 mm).

Good: Adhesive force is 25 N/25 mm or more

Poor: Adhesive force is less than 25 N/25 mm

[Total Light Transmittance]

The total light transmittance of the pressure-sensitive adhesive layer (pressure-sensitive adhesive double sided tape) prepared in each of Examples and Comparative Examples was measured in the following manner.

The total light transmittance Y of the pressure-sensitive adhesive layer was measured in accordance with JIS K7361-1. Specifically, the total light transmittance Y was measured in an atmosphere at 23° C. and a humidity of 50% with a haze mater (e.g., Haze Meter NDH4000 manufactured by NIPPON DENSHOKU INDUSTRIES Co., Ltd.).

The total light transmittance X (%) per micrometer of the thickness was calculated using the following expression from the total light transmittance Y (%) and the thickness T (μm) of the pressure-sensitive adhesive layer.

[Expression 4]

$$\underset{(\%)}{\text{Total light transmittance } Y} = 100\times\left(\frac{\text{Total light transmittance } X}{100}\right)^{T}$$

[Resistance Value]

The release sheet was removed from the pressure-sensitive adhesive tape obtained in each of Examples and Comparative example and having a size of 50 mm×50 mm. Then, a resistance meter Hiresta-UP MCP-HT450 (manufactured by Mitsubishi Chemical Analytech Co., Ltd.) was equipped with an electrode URS probe (manufactured by Mitsubishi Chemical Analytech Co., Ltd.), and the electrode was brought into contact with the surface of the pressure-sensitive adhesive tape to measure the resistance.

[Total Evaluation]

Good: "Good" was given in both the evaluation in the sacrificial protection test and that in the adhesive force loss.

Poor: "Poor" was given in at least one of the evaluation in the sacrificial protection test and that in the adhesive force loss.

Example 7

A pressure-sensitive adhesive composition was prepared according to the formulation described in Table 2. Purge with nitrogen gas was carried on the pressure-sensitive adhesive composition to remove dissolved oxygen. Then, a spacer having a thickness of 600 μm was placed on the release-treated side of a release sheet, and the pressure-sensitive adhesive composition was applied to the release-treated side of the release sheet. Then, the applied pressure-sensitive adhesive composition was covered with another release sheet such that the release-treated side thereof was brought into contact with the pressure-sensitive adhesive composition. The release sheets used were each a PET film (thickness 50 μm) that had undergone mold-release treatment with silicone.

In that state, the lamp intensity of the chemical lamp was adjusted such that the intensity of irradiation with ultraviolet rays was 5 mW/cm$^2$ on the release sheet on the cover side, and one side was irradiated with ultraviolet rays to obtain an anticorrosive pressure-sensitive adhesive double sided tape consisting of a pressure-sensitive adhesive layer alone with release sheets attached to both sides thereof. The thickness of the pressure-sensitive adhesive layer (that is, the pressure-sensitive adhesive double sided tape) was 600 μm. The results are shown in Table 2.

Examples 8 to 10, Comparative Examples 4 to 7

An anticorrosive pressure-sensitive adhesive double sided tape was obtained in the same manner as in Example 7, except for preparing a pressure-sensitive adhesive composition according to the formulation described in Table 2. The results are shown in Table 2.

TABLE 2

| | | Example | | | | Comparative Example | | | |
|---|---|---|---|---|---|---|---|---|---|
| | | 7 | 8 | 9 | 10 | 4 | 5 | 6 | 7 |
| Pressure-sensitive adhesive composition (parts by weight) | 2-Ethylhexyl acrylate | 85 | 85 | 85 | 85 | 85 | 85 | 85 | 85 |
| | n-Butyl acrylate | 15 | 15 | 15 | 15 | 15 | 15 | 15 | 15 |
| | Acrylic acid | 5 | 5 | 5 | 5 | 5 | 5 | 5 | 5 |
| | Olefin polymer | 10 | 10 | 10 | 10 | 10 | 10 | 10 | 10 |
| | Crosslinking agent | 1 | 1 | 1 | 1 | 1 | 1 | 1 | 1 |
| | Tackifier resin 1 | 5 | 5 | 5 | 5 | 5 | 5 | 5 | 5 |
| | Tackifier resin 2 | 5 | 5 | 5 | 5 | 5 | 5 | 5 | 5 |
| | Fine particle | 0.8 | 0.8 | 0.8 | 0.8 | 0.8 | 0.8 | 0.8 | 0.8 |
| | Metal having a lower potential than that of iron (zinc particle) | 15 | 15 | 15 | 15 | 15 | 15 | 0 | 15 |
| | Electroconductive material (CNT (1)) | 0.01 | 0.025 | 0.15 | 0 | 0 | 0 | 0.01 | 0 |
| | Electroconductive material (CNT (2)) | 0 | 0 | 0 | 0.025 | 0 | 0 | 0 | 0 |
| | Electroconductive material (carbon black) | 0 | 0 | 0 | 0 | 4 | 2 | 0 | 0 |
| | Dispersant | 0.01 | 0.025 | 0.15 | 0.025 | 0 | 0 | 0.01 | 0 |
| | Polymerization initiator | 0.2 | 0.2 | 0.2 | 0.2 | 0.2 | 0.2 | 0.2 | 0.2 |
| Physical properties of pressure-sensitive adhesive layer | Thickness (μm) | 600 | 600 | 600 | 600 | 600 | 600 | 600 | 600 |
| | Total light transmittance X (%) (per micrometer of thickness) | 99.83 | 99.77 | 99.25 | 99.73 | 99.30 | 99.50 | 99.87 | 99.90 |
| | Resistance value (Ω) | $1 \times 10^{15}$ | $1 \times 10^{14}$ | $1 \times 10^{11}$ | $1 \times 10^{14}$ | $1 \times 10^{8}$ | $1 \times 10^{10}$ | $1 \times 10^{14}$ | $1 \times 10^{15}$ |
| Evaluations | Sacrificial protection test: potential (mV) | −750 | −850 | −860 | −800 | −750 | −600 | −500 | −550 |
| | Sacrificial protection test: evaluation | Good | Good | Good | Good | Good | Poor | Poor | Poor |
| | Adhesive force on other side of irradiated side (N/25 mm) | 55 | 50 | 40 | 50 | 6 | 40 | 60 | 55 |

TABLE 2-continued

| | Example | | | | Comparative Example | | | |
|---|---|---|---|---|---|---|---|---|
| | 7 | 8 | 9 | 10 | 4 | 5 | 6 | 7 |
| Adhesive force: evaluation | Good | Good | Good | Good | Poor | Good | Good | Good |
| Total evaluation | Good | Good | Good | Good | Poor | Poor | Poor | Poor |

Each of the components in Table 2 are as follows.

Olefin polymer: product name "L-1253", manufactured by KURARAY CO., LTD., hydrogenated polybutadiene having a (meth)acryloyl group at one end.

Crosslinking agent: product name "TEAI-1000", manufactured by NIPPON SODA CO., LTD.

Tackifier resin 1: product name "ARKON P140", manufactured by Arakawa Chemical Industries, Ltd., hydrogenated petroleum resin, softening point 140° C.

Tackifier resin 2: product name "ARKON P100", manufactured by Arakawa Chemical Industries, Ltd., hydrogenated petroleum resin, softening point 100° C.

Fine particle: product name "Cel-star Z-27", manufactured by Tokai Kogyo, K. K., glass balloon Zinc particle: product name "Zinc powder #40", manufactured by SAKAI CHEMICAL INDUSTRY CO., LTD., average particle size 50 μm Electroconductive material (CNT (1)): carbon nanotube (CNT), product name "JENOTUBE 8A", manufactured by JEIO, average diameter 6 to 9 nm, average length 100 to 200 μm Electroconductive material (CNT (2)): carbon nanotube (CNT), product name "JENOTUBE 10A", manufactured by JEIO, average diameter 6 to 15 nm, average length 50 to 200 μm Electroconductive material: carbon black, product name "AT-NO.15S", manufactured by Oriental Industry Co. LTD.

Dispersant: product name "S-LEC BX-L", manufactured by SEKISUI CHEMICAL CO., LTD., polyvinyl butyral resin Polymerization initiator: 2,2-dimethoxy-2-phenylacetophenone The pressure-sensitive adhesive tapes according to Examples 7 to 10 were each a pressure-sensitive adhesive tape having pressure-sensitive adhesive layer containing a metal having a lower potential than that of iron and carbon nanotube, and showed a great adhesive force and high sacrificial corrosion resistance.

In contrast, the pressure-sensitive adhesive tapes according to Comparative Examples 4 to 7 were each a pressure-sensitive adhesive tape that does not contain at least one of the metal having a lower potential than that of iron and carbon nanotube, which does not satisfy the requirements of the present invention, and were inferior in at least one of the sacrificial corrosion resistance and the adhesive force.

The invention claimed is:

1. A pressure-sensitive adhesive tape comprising a pressure-sensitive adhesive layer comprising a photo-cured acrylic resin, a metal having a lower potential than that of iron, and an electroconductive material other than the metal, the pressure-sensitive adhesive layer having a total light transmittance X, per micrometer of a thickness thereof, of 99.85% or less, and the pressure-sensitive adhesive layer having a total light transmittance Y of 6% or more, wherein the content of the metal having a lower potential than that of iron in the pressure sensitive adhesive layer is 3 to 25 mass % based on the total mass of the pressure sensitive adhesive layer, wherein the electroconductive material comprises a carbon nanotube, wherein the content of the carbon nanotube in the pressure-sensitive adhesive layer is 0.005 to 0.7 mass % based on the total amount of the pressure-sensitive adhesive layer, and wherein the thickness of the pressure-sensitive adhesive layer is 200 to 1500 μm.

2. The pressure-sensitive adhesive tape according to claim 1, wherein the metal having a lower potential than that of iron is zinc.

3. The pressure-sensitive adhesive tape according to claim 1, wherein the photo-cured acrylic resin is a polymerized product of a polymerizable monomer comprising an alkyl (meth)acrylate monomer (A).

4. The pressure-sensitive adhesive tape according to claim 3, wherein the polymerizable monomer further comprises a polar group-containing vinyl monomer (B).

5. The pressure-sensitive adhesive tape according to claim 1, wherein the pressure-sensitive adhesive layer has a potential of −700 mV or less in a sacrificial protection test.

6. The pressure-sensitive adhesive tape according to claim 1, wherein the pressure-sensitive adhesive tape consists of the pressure-sensitive adhesive layer.

7. The pressure-sensitive adhesive tape according to claim 1, comprising a support, wherein the pressure-sensitive adhesive layer is provided on one side or each of both sides of the support.

8. The pressure-sensitive adhesive tape according to claim 1, wherein the pressure-sensitive adhesive tape is for use in anticorrosion.

9. A pressure-sensitive adhesive tape comprising a pressure-sensitive adhesive layer comprising a metal having a lower potential than that of iron, and a carbon nanotube, wherein the content of the metal having a lower potential than that of iron in the pressure sensitive adhesive layer is 3 to 25 mass % based on the total mass of the pressure sensitive adhesive layer, wherein the content of the carbon nanotube in the pressure-sensitive adhesive layer is 0.005 to 0.7 mass % based on the total amount of the pressure-sensitive adhesive layer, and wherein the thickness of the pressure-sensitive adhesive layer is 200 to 1500 μm.

10. The pressure-sensitive adhesive tape according to claim 9, wherein the pressure-sensitive adhesive layer has a total light transmittance X, per micrometer of a thickness thereof, of 99.85% or less.

11. The pressure-sensitive adhesive tape according to claim 9, wherein the metal having a lower potential than that of iron is zinc.

12. The pressure-sensitive adhesive tape according to claim 9, wherein the pressure-sensitive adhesive layer is made with an acrylic adhesive.

13. A structure comprising a steel structure and a pressure-sensitive adhesive tape adhered to the steel structure, wherein the adhesive tape is the adhesive tape according to claim 1.

14. The structure according to claim 13, wherein the steel structure is bridges, steel towers, viaducts, tanks, plants, or piers.

* * * * *